W. B. ALLBRIGHT.
HOG SCRAPING, DEHAIRING, POLISHING, AND CLEANING MACHINE.
APPLICATION FILED JAN. 2, 1915.
1,221,406.
Patented Apr. 3, 1917.
9 SHEETS—SHEET 4.
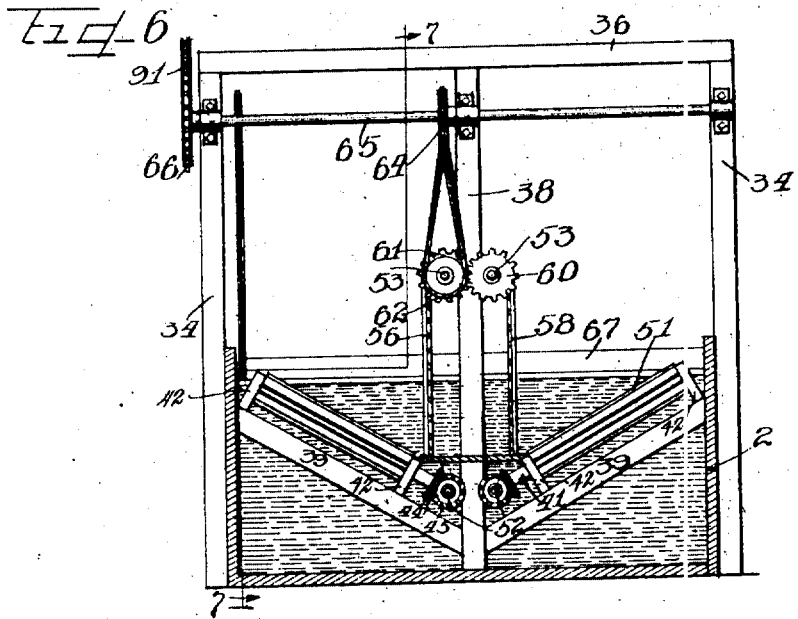
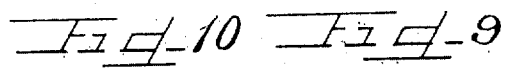
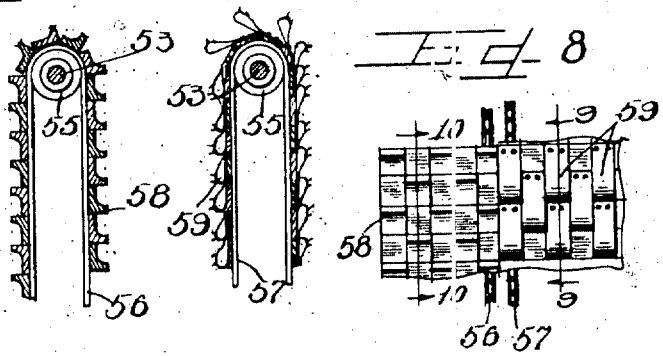

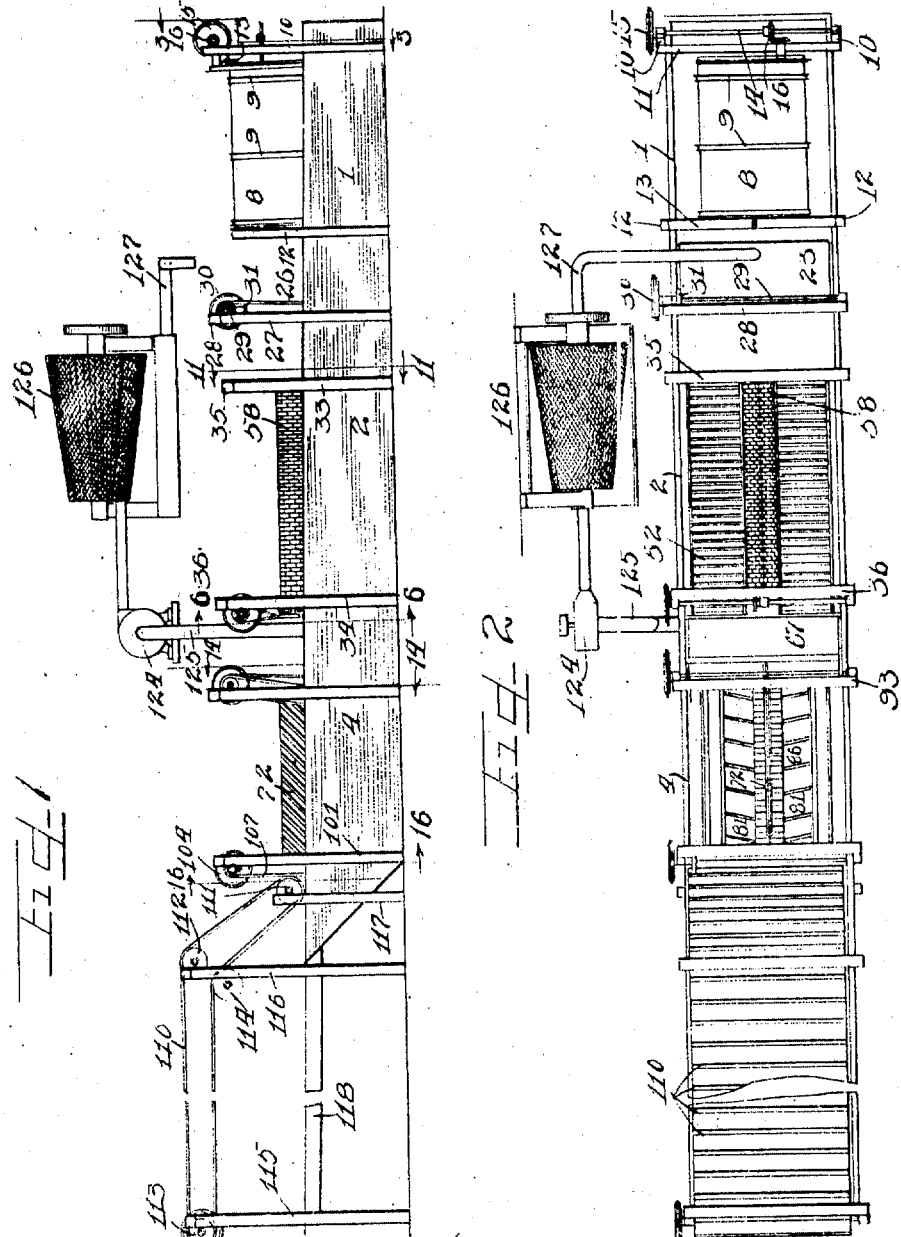

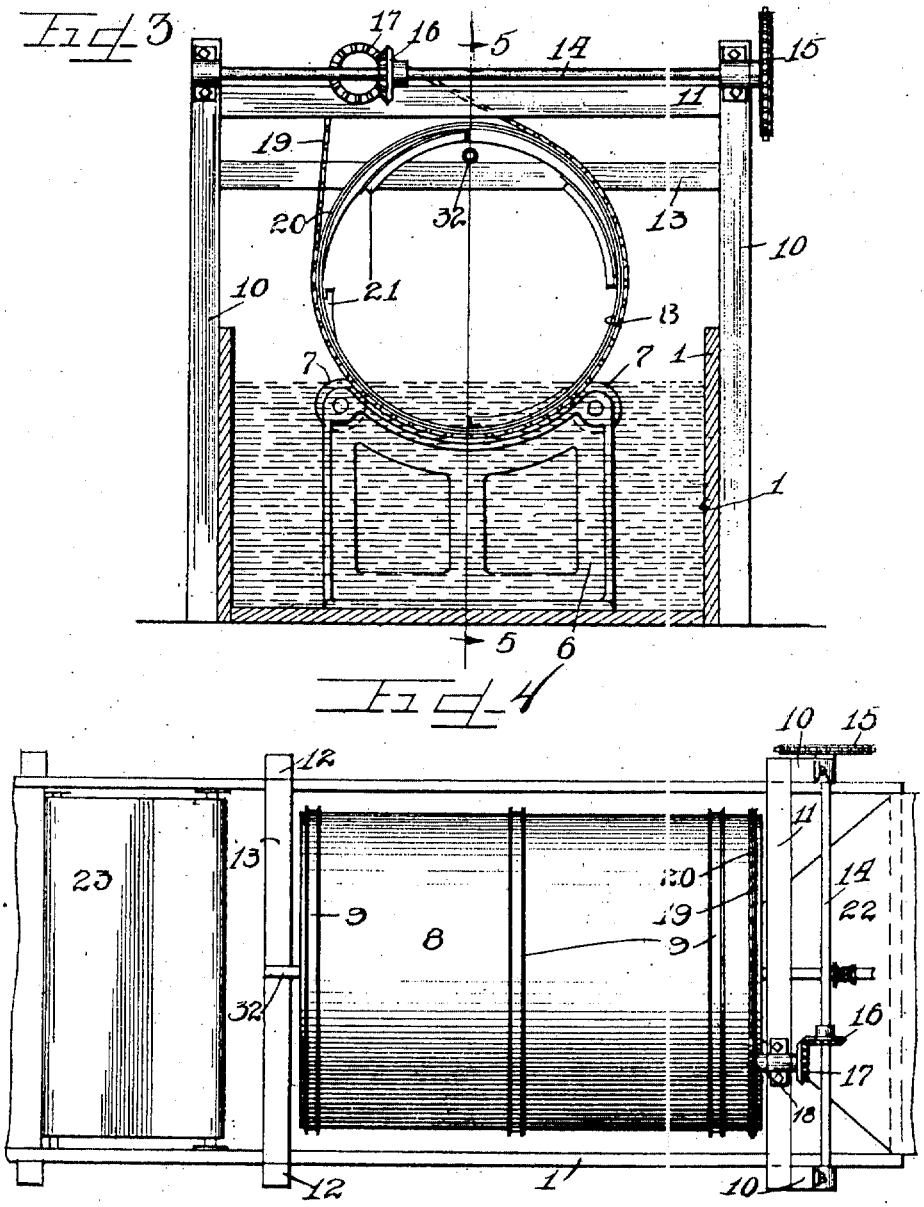

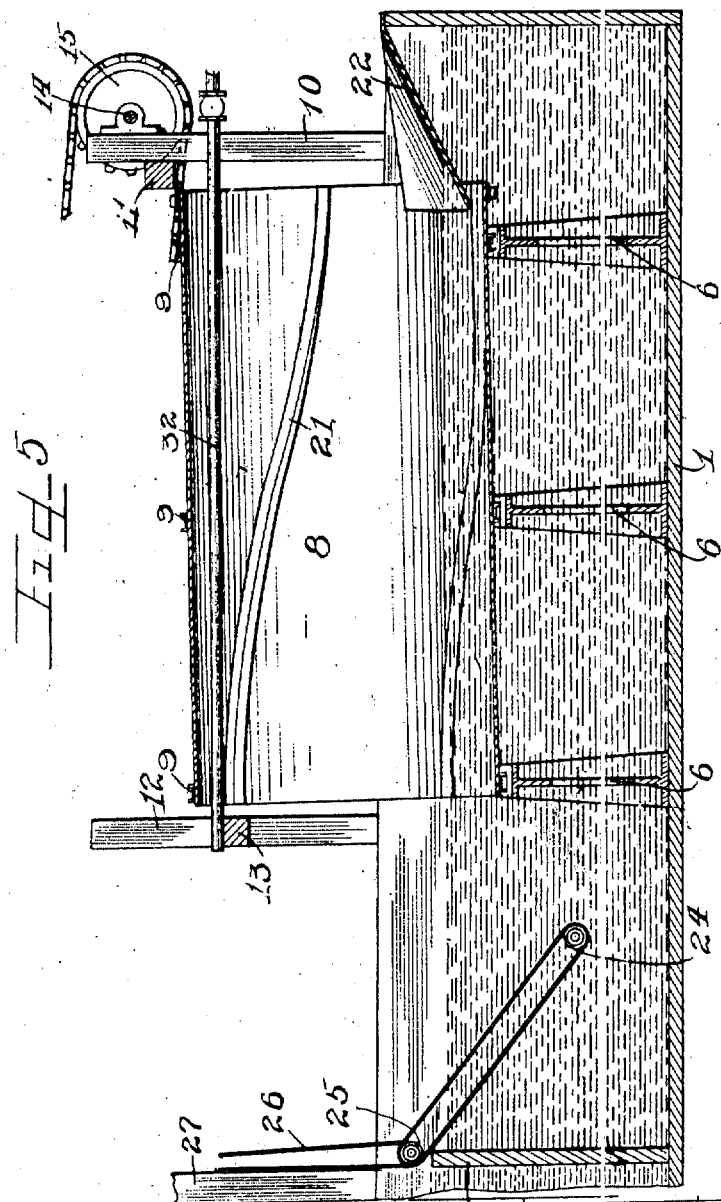

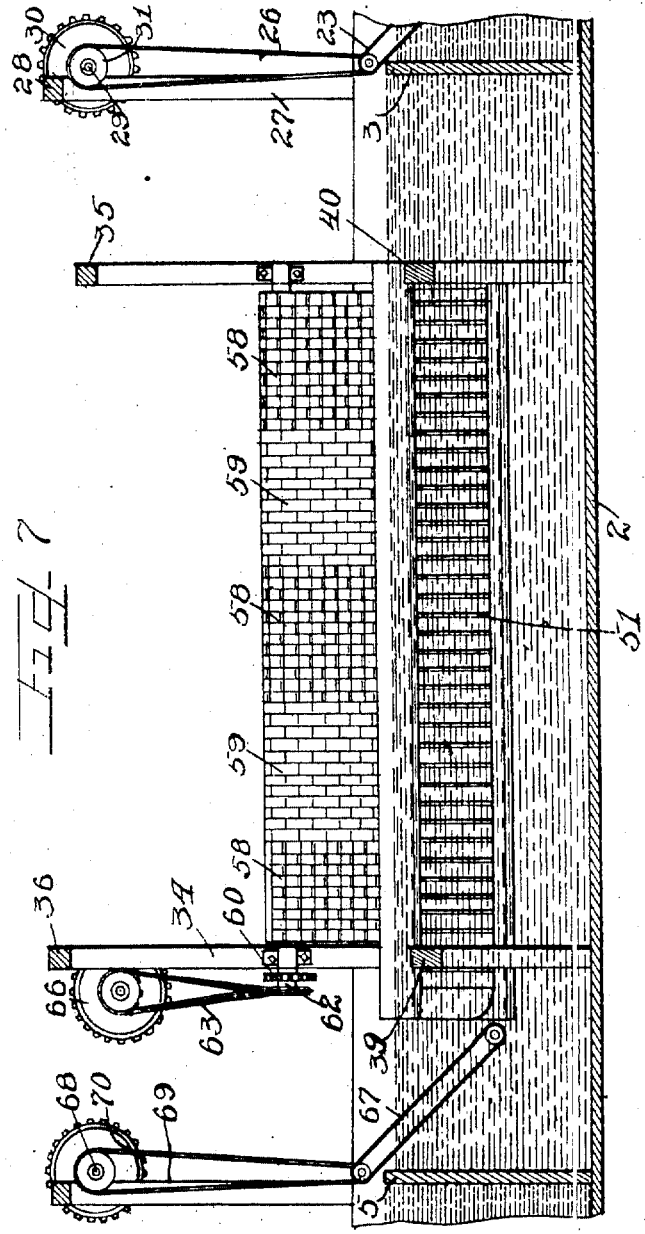

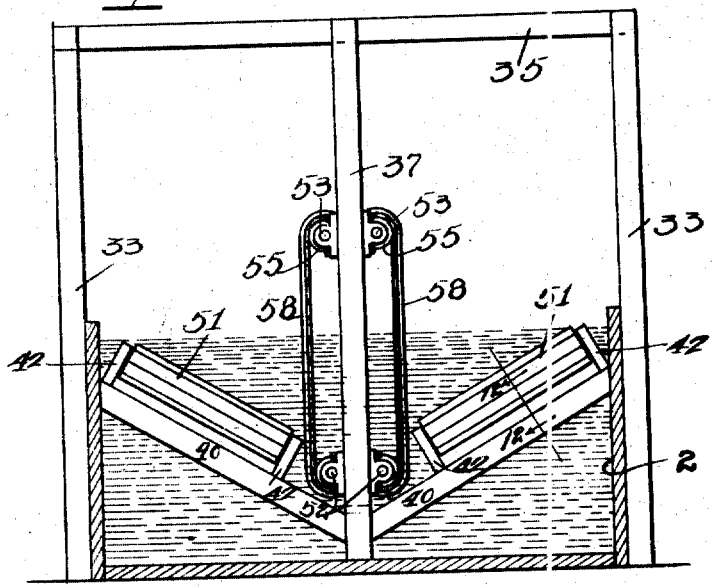
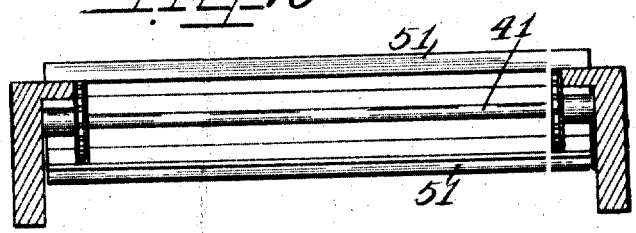
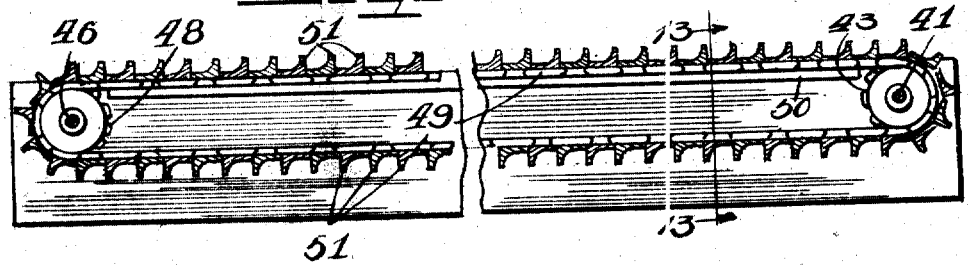

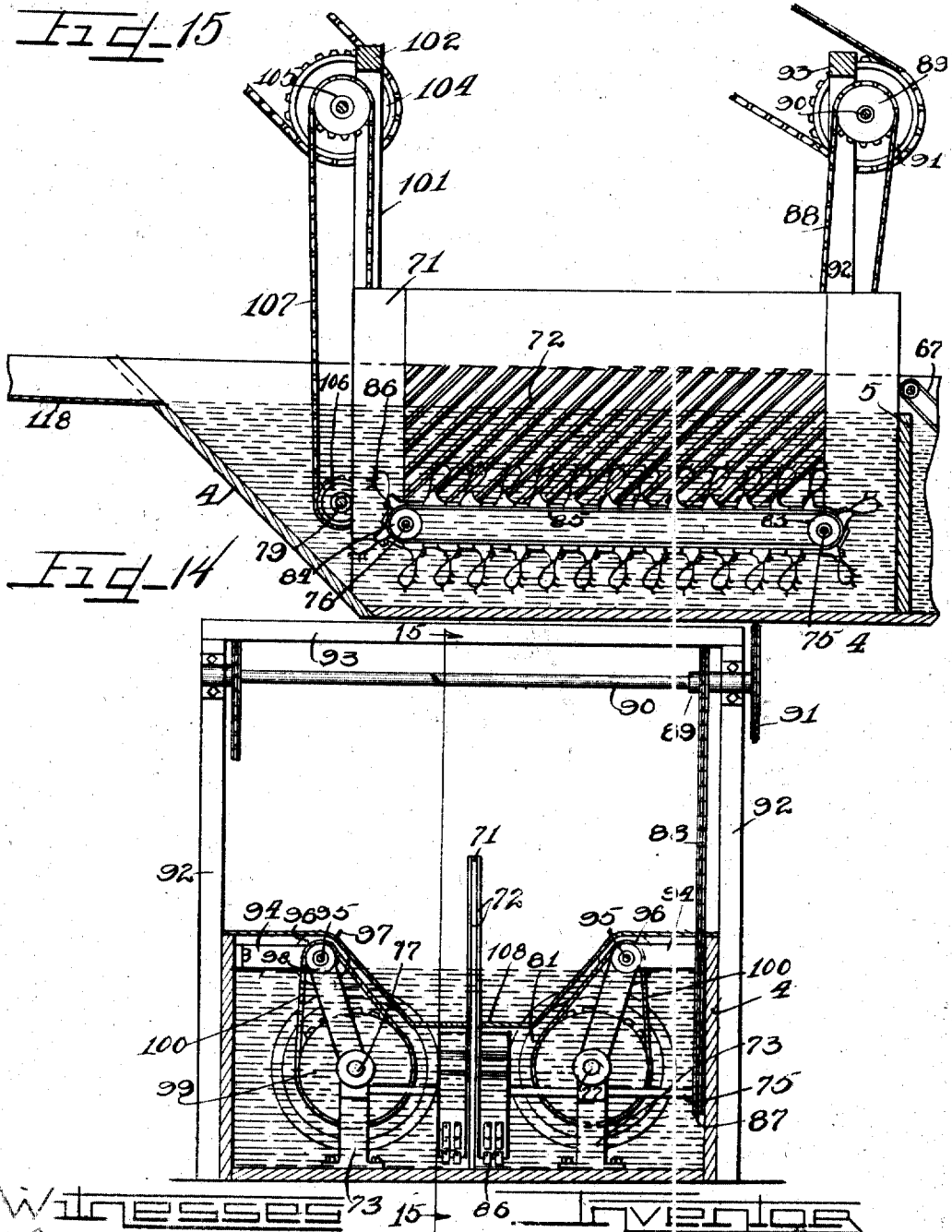

W. B. ALLBRIGHT.
HOG SCRAPING, DEHAIRING, POLISHING, AND CLEANING MACHINE.
APPLICATION FILED JAN. 2, 1915.
1,221,406.  
Patented Apr. 3, 1917.  
9 SHEETS—SHEET 8.
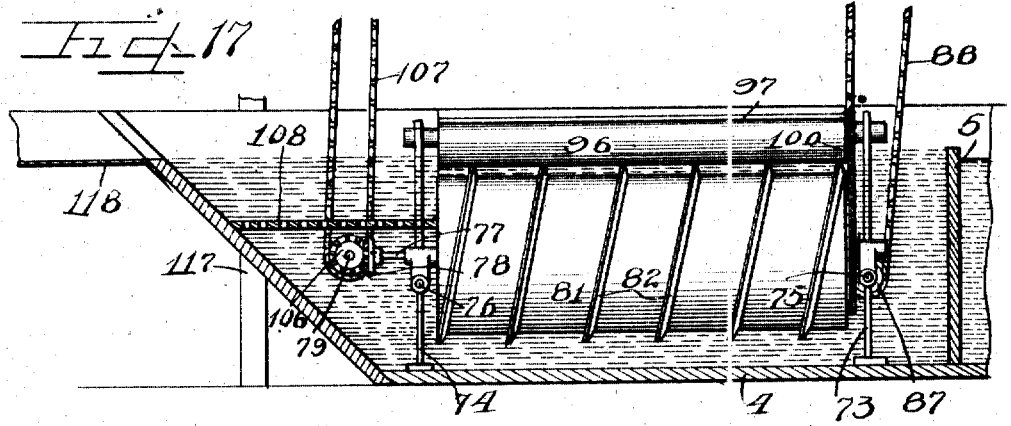
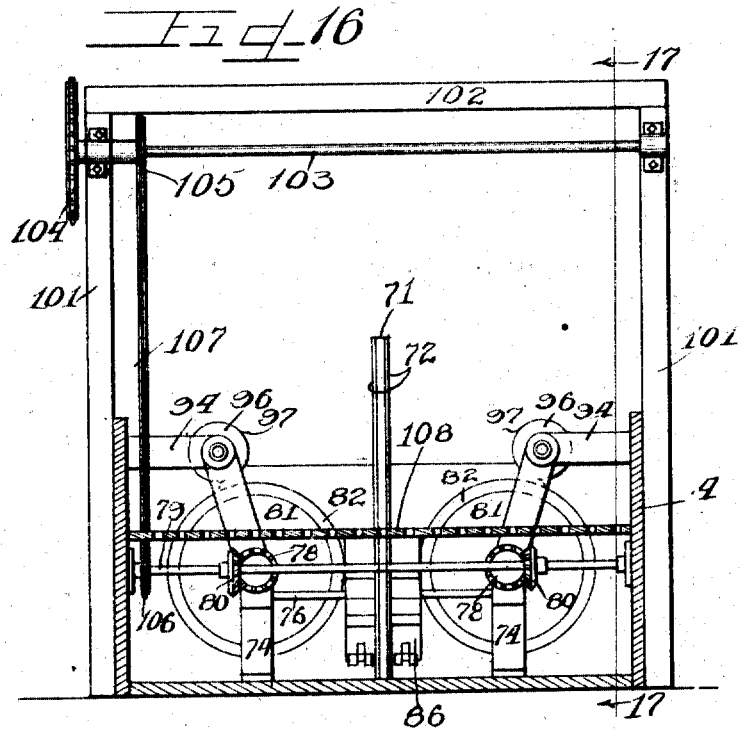

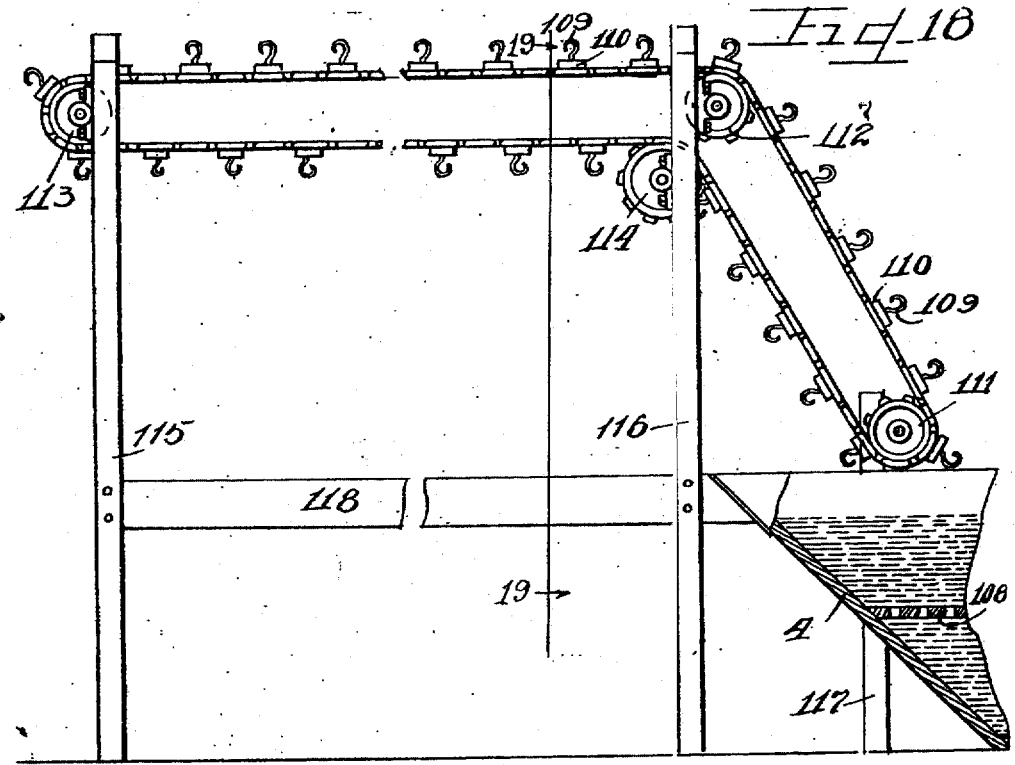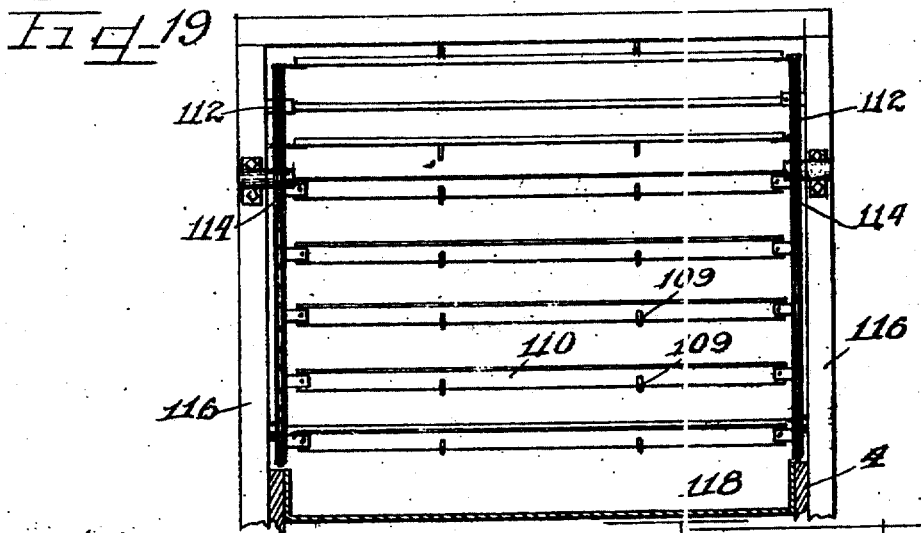

UNITED STATES PATENT OFFICE.

WILLIAM B. ALLBRIGHT, OF CHICAGO, ILLINOIS.

HOG SCRAPING, DEHAIRING, POLISHING, AND CLEANING MACHINE.

1,221,406.     Specification of Letters Patent.     Patented Apr. 3, 1917.

Application filed January 2, 1915. Serial No. 97.

*To all whom it may concern:*

Be it known that I, WILLIAM B. ALLBRIGHT, a citizen of the United States, and a resident of the city of Chicago, in the county of Cook and State of Illinois, have invented certain new and useful Improvements in Hog Scraping, Dehairing, Polishing, and Cleaning Machines; and I do hereby declare that the following is a full, clear, and exact description of the same, reference being had to the accompanying drawings, and to the numerals of reference marked thereon, which form a part of this specification.

This invention relates to a machine for dehairing a carcass, as well as scrubbing and polishing the same, the carcass being passed through a number of different stages of operation and different baths so that when it finally emerges from the machine it is thoroughly cleaned and entirely free from hair. Difficulty has been experienced in the past in properly removing the hair from the flanks of a carcass, for the reason that, particularly in the case of hogs, the fatty tissues which are found at the flanks are of such a soft and yielding nature that the scraping or dehairing mechanisms generally provided do not properly act thereon.

It is an object of this invention to construct a hog dehairing machine consisting of a plurality of separately mounted mechanisms, which receive the carcass, one from another in its passage through the machine, each mechanism performing a particular kind of operation on the carcass, whereby on the completion of the process, the carcass is thoroughly cleaned, polished, and entirely free from hair.

It is also an object of this invention to construct a machine wherein a carcass is passed first through a rotating cylinder partially submerged in a scalding tank which serves to remove the superfluous hair and dirt from the carcass, then into scraping mechanisms which remove practically all the hair therefrom, and finally through scrubbing and polishing devices which remove all remaining hair and scrub and polish the carcass in a bath of clean water, from which it is finally removed by suitable conveying mechanism.

It is also an object of this invention to construct a machine in which a carcass undergoes several stages of operation, the mechanism of each stage not only operating on the carcass to perform its purpose, but as well acting to convey the carcass onwardly at all times, so that the carcass automatically passes from one mechanism to another and finally emerges from the machine thoroughly scraped, scrubbed and polished.

It is also an object of this invention to construct a machine wherein a carcass to be dehaired is subjected in different stages to different mechanisms, some movable relatively to the carcass, and others serving to move the carcass against stationary means which perform a particular function, and all cooperating to thoroughly dehair a carcass, as well as clean and polish the same.

It is furthermore an object of this invention to construct a device wherein a carcass is passed through several stages, and in each stage subjected to a different washing water, so that the carcass, after finally emerging from the last stage of operation of the machine is entirely clean and free from hair.

It is finally an object of this invention to construct a dehairing machine wherein the carcass is automatically passed from one to another of certain dehairing mechanisms which serve to dehair the carcass, thoroughly scrubbing, cleaning and massaging the skin to impart a high polish thereto.

The invention (in a preferred form) is illustrated in the drawings and hereinafter more fully described.

In the drawings:

Figure 1 is a conventional side elevation of a machine embodying the principles of my invention.

Fig. 2 is a top plan view thereof.

Fig. 3 is a section through the mechanisms of the first stage of the machine taken on line 3—3 of Fig. 1.

Fig. 4 is a fragmentary enlarged top plan view of the mechanism of the first stage illustrated in Fig. 3.

Fig. 5 is a longitudinal section through the mechanism of the first stage of the machine taken on line 5—5 of Fig. 3.

Fig. 6 is a vertical section taken through the second stage of the machine on line 6—6 of Fig. 1.

Fig. 7 is a longitudinal section therethrough taken on line 7—7 of Fig. 6.

Fig. 8 is a fragmentary enlarged face view of the vertical movable dehairing and scraping mechanism in the second stage of the machine.

Fig. 9 is a fragmentary section taken on line 9—9 of Fig. 8.

Fig. 10 is a fragmentary section taken on line 10—10 of Fig. 8.

Fig. 11 is a view similar to Fig. 6, taken on line 11—11 of Fig. 1.

Fig. 12 is a section taken on line 12—12 of Fig. 11.

Fig. 13 is a section taken on line 13—13 of Fig. 12.

Fig. 14 is a transverse vertical section taken on line 14—14 of Fig. 1, through the third stage of the machine.

Fig. 15 is a longitudinal vertical section of the third stage taken on line 15—15 of Fig. 14.

Fig. 16 is a transverse vertical section similar to Fig. 14, and taken on line 16—16 of Fig. 1.

Fig. 17 is a view taken on line 17—17 of Fig. 16.

Fig. 18 is an enlarged detail side elevation partly in section of the conveying and elevating mechanism by which the carcass is moved from the third stage of the machine.

Fig. 19 is a fragmentary sectional view taken on line 19—19 of Fig. 18.

As shown in the drawings:

The mechanisms of each of the three stages of the machine are mounted either partially or entirely submerged in water within suitable tanks for the purpose, and for this purpose a tank 1, is provided for the mechanisms of the first stage, and is separated from a tank 2, of the second stage, by a partition 3, such that the level of the liquid in the second stage is higher than that in the first stage, but is permitted to flow over said partition into the first stage tank. A tank 4, for the third and last stage of the machine is separated from the tank 2, of the second stage by means of a partition 5, which is of a height such that the liquid in the third stage tank is at a higher level than that in the second stage, and is permitted to flow over said partition from the third stage into the second stage tank. Mounted upon the floor of the tank 1, of the first stage of the machine, are a plurality of standards 6, of different heights, each one of which is curved along the arc of a circle on its upper side and is provided with rollers 7.

A hollow cylinder 8, provided with grooved or channeled track members 9, extending circumferentially around the exterior thereof, rests upon the rollers of said standards in a slightly inclined position with the rollers tracking in said channel members, so that the cylinder may be rotated and is held supported upon said rollers. Uprights 10, are mounted near the entrance end on the sides of the tank 1, and are connected by means of a cross piece 11, and similarly uprights 12, are mounted near the other end of said tank, and are connected by means of a cross piece 13. A transverse shaft 14, is journaled on said uprights 10, in suitable bearings for the purpose, and at its outer end is provided with a driving pulley 15. Near the other end of said shaft a bevel pinion 16, is keyed thereon, which meshes with a bevel pinion 17, secured on the end of a shaft which is journaled on said cross piece 11. The shaft which carries said bevel pinion 17, is provided at its opposite end with a pulley or sprocket wheel 18, around which is trained a chain or cable 19, which is also trained around within a suitable grooved member 20, on the periphery of said cylinder 8. The interior of said cylinder 8, is provided with helically disposed scraping ribs 21, which also assist in moving the carcass therethrough.

An entrance chute 22, is mounted on an incline at the forward end of the tank 1, and communicates into the end of said cylinder 8, whereby carcasses may be easily introduced into the machine. As clearly shown in Fig. 5, the inclined cylinder 8, is mounted in such a position on the standards 8, as to be partially submerged in the water within the tank, so that a carcass passing through said cylinder is at all times subjected to plenty of scalding water.

Mechanism is provided for conveying the carcass from the tank of the first stage into the tank of the second stage, over the partition 3, and this consists of a conveyer 23, the lower end of which is trained about a roll 24, journaled transversely in the tank 1, and the upper end of which is trained about a roll 25, journaled above said partition 3, and driven by means of a belt or chain 26, which engages around a suitable pulley on the end of said roller 25. For the purpose of driving said belt 26, uprights 27, are provided on each side of the machine and are connected by means of a transverse cross piece 28. Adjacent said cross piece, and journaled in suitable bearings on said uprights, is a shaft 29, on one of its ends provided with a driving pulley 30, and also having a belt pulley 31, around which said belt 26, is engaged. A valved spray pipe 32, supported at one of its ends upon the cross piece 13, extends through said cylinder 8, along the upper side of the interior thereof.

In the second stage of the machine mechanism is provided not only for conveying the carcass along, but for subjecting the same to scraping and dehairing means which move vertically, causing rotation of the carcass upon its carrying means whereby the carrying means is also brought into operation as a scraping mechanism. For this purpose two carrying means are provided, one mounted longitudinally on each side of the interior of the tank and connected to operate on different carcasses independently and simultaneously, the vertical scraping mechanisms also being duplicated one for each carrier. Accordingly uprights 33, are provided near one end of the tank 2, and similarly uprights 34, are provided near the other end thereof, each of the uprights being connected together by suitable cross pieces 35 and 36, respectively. Mounted vertically in said tank 2, between said uprights 33, is a central upright 37, and similarly between said uprights 34, a central upright 38, is provided.

Inclined braces 40, are mounted within the tank 2, extending from the side walls thereof, downwardly to the central upright 37, and similarly braces 39, are mounted near the other end of the tank and extend downwardly and are secured to the central upright 38. A shaft 41, is journaled above each of the braces 39, in longitudinal ways 42, and has secured thereon sprocket wheels 43, and said shaft is also provided with a bevel pinion 44, which meshes with a driving bevel pinion 45. Similarly, near the other end of the machine a shaft 46, is journaled upon each of the brace members 40, and on each of said shafts are sprocket wheels 48.

Trained about the respective sprocket wheels 43 and 48, are chains 49, the upper run of which rests upon guides or track members 50, which project inwardly from the longitudinal ways 42. Extending transversely between the links of said chains are bars 51, which serve to support and convey a carcass and to scrape the carcass when relative movement takes place between the carcass and said bars. Said driving bevel pinions 45, are mounted on parallel shafts 52, which are journaled in suitable bearings mounted on the respective center uprights 37 and 38.

Shafts 53, extending longitudinally with in the tank 2, are also journaled on said respective central uprights 37 and 38, and are disposed respectively directly above and parallel to said shafts 52. A number of sprocket wheels 54, are secured on each of the shafts 52, at points intermediate the ends thereof, and similarly sprocket wheels 55, are secured upon said shafts 53, and trained entirely around all of said shafts 52 and 53, on the respective sprocket wheels, are a plurality of chains 56 and 57. Secured upon and extending between the chains 56, are a number of linked scraper members 58, and likewise secured upon and extending between the chains 57, are a plurality of small linked flexible beater or scraper elements 59, which are in the form of a loop of fabric with scraper blades secured on the outer side of each of the loops. Near the ends of said shafts 53, intermeshing gears 60 and 61, are provided, to cause said respective shafts 53, to rotate simultaneously, the one driven by the other. Another sprocket wheel 62, is secured adjacent said sprocket wheel 61, and a chain 63, is trained therearound and about a sprocket wheel 64, rigidly secured upon a transverse shaft 65, extending between the uprights 34, on the sides of the tank. Said shaft 65, is provided at one of its ends with a driving sprocket or pulley 66, which is driven in any suitable manner. Of course the drive to said shafts 52, is transmitted through the respective chains 56 and 57, which carry the scraper mechanisms, so that the conveying and scraping means 51, are driven thereby. After being carried along by said scraper conveyer 51, the carcasses are discharged upon an inclined conveyer 67, which slopes upwardly from said scraper conveyers 51, to a point above the partition 5. Said conveyer 67, is driven from a shaft 68, journaled transversely of the machine on uprights 69, with a chain 70, trained about suitable sprocket wheels, one on said shaft 68, and the other on the shaft supporting the upper roll of the conveyer. Of course, the shaft 68, receives its drive in any suitable manner by a belt or chain trained about a sprocket or pulley wheel secured on the outer end of said shaft 68. The carcasses received from either one or both of the conveying mechanisms 51, upon said conveyer 67, are elevated thereby and discharged into the tank 4, of the third or last stage of the machine.

In this stage rotary and linearly movable mechanism coact with stationary scraping means to support, roll and convey the carcass. Mounted within and extending vertically and longitudinally of the tank 4, is a partition 71, which serves to divide the tank into two compartments for a portion of its length. Said partition is provided on each of its opposite surfaces with stationary inclined scraping members 72, so that a carcass moving through the tank on either side of said partition and contacting the elements 72, thereon will be scraped thereby.

Mounted on the floor of the tank on each side of said partition, and near each end thereof are standards 73 and 74, the standards 73, adjacent the partition 5, having journaled therein transversely of the tank a shaft 75, and similarly a transverse shaft 76, is journaled in said standards 74. Journaled longitudinally in one each of the standards 73 and 74, are shafts 77, each one of which is provided at one end with a bevel pinion 78. A shaft 79, is journaled transversely in the tank 4, and has secured thereon bevel pinions 80, which mesh with said respective pinions 78, to drive said shafts 77. Secured on each of said shafts 77, are relatively large rolls 81, each of which has a helically disposed continuous scraper rib 82, formed or attached around the outer periphery thereof, adapted to scrape the carcass and assist in conveying the same forwardly through the machine. Rigidly secured upon each of said respective transverse shafts 75 and 76, are rolls 83 and 84, respectively, one pair disposed on each side of said partition 71, and trained about each of the rolls 83 and 84, of each pair, is a belt 85, carrying a plurality of flexible beater or looped scraper mechanisms 86, which move linearly between the roll 81, and said stationary partition. The drive for said respective belts is imparted thereto through the shaft 75, which has a pulley 87, secured on one end thereof and trained about which is a cable 88, which is also trained about a pulley 89, secured upon a transverse shaft 90, which is in turn driven in any suitable manner through a pulley or sprocket wheel 91, secured thereon. Said transverse shaft 90, is journaled upon uprights 92, mounted on each side of said tank 4, said uprights being connected by means of a cross piece 93, extending over the top thereof. Auxiliary scraping rolls are also provided to coact with the large rolls 81, and for this purpose brackets 94, extend inwardly from the side walls of the tank on the sides thereof, and downwardly to said bearing members 73 and 74, and journaled therein are shafts 95, on each of which is mounted a roller 96, with scraper elements 97, thereon. For the purpose of rotating said respective rolls 96, sprocket wheels 98, are provided on each of said shafts 95, and a large sprocket wheel 99, is also secured on each of said shafts 77, permitting a chain 100, trained thereabout to transmit a drive between said respective shafts. Uprights 101, also mounted in the discharge end of the machine on each side of the tank 4, and are connected at their upper ends by means of a cross piece 102. Journaled on said uprights 101, is a shaft 103, adapted to be driven in any suitable manner by means of a pulley or sprocket 104, secured thereon. A sprocket wheel 105, is secured on said shaft 103, adjacent one of the uprights 101, and similarly a sprocket 106, is secured upon said shaft 79, and a chain 107, is trained over said respective sprockets to drive the shaft 79, from the shaft 103. A channel shaped floor 108, is built transversely across the machine at the discharge end of said respective rollers and scraping mechanisms in the third stage to receive the finished and polished carcass thereon.

In the third stage practically all of the mechanisms are entirely submerged, with the exception of the rolls 96, which extend below the surface of the water in the tank only a small amount. After the scraping, polishing, cleaning and dehairing operations have been completed upon the carcass, the operator attaches a suitable gambrel to the leg of the carcass, and hooks the same over a hook 109, a number of which are secured upon the cross bars 110, of a slatted conveyer. Said conveyer is trained about rolls 111, 112, 113, and 114, said rolls 112, 113, and 114, being mounted upon suitable uprights 115, and 116. The roll 111, is journaled on short uprights 117, one disposed on each side of the discharge end of the tank 4. A drip pan 118, is disposed beneath the horizontal run of said conveyer to receive the water draining from the carcasses, permitting the same to flow back into said tank 4.

The operation is as follows:

The carcass is introduced into the machine upon the inclined chute 22, entering the tank 1, of the first stage of the operating mechanism and slides downward into the interior of the rotating cylinder 8, whereupon the scraper ribs 21, serve to assist in moving the carcass therethrough and at the same time remove superfluous dirt and hair from the carcass, the water in which said cylinder is partially submerged washing the carcass, as well as scalding the same during its progress. Immediately after its passage through said cylinder 8, the carcass is conveyed into the tank 2, by means of said conveyer 23, and is introduced upon either one of the two inclined scraper conveyer mechanisms which move longitudinally within said tank 2. Owing to the inclination of the conveyer the carcass is caused to rest against and is partly supported by the vertically moving dehairing mechanisms 58 and 59, which also cause the carcass to rotate on the carrying scraper elements 51, which thus assist in dehairing the same.

Practically all the hair is removed from the carcass in the second stage of the machine, and after its passage therethrough, the carcass is conveyed into the third stage, or the tank 4, by means of a conveyer 67, on which the carcass is discharged from said inclined conveying mechanisms 51. The carcass introduced into the third stage of the machine is positioned longitudinally between one of the large rolls 81, and the stationary partition, and is caused to rotate due to the movement of the rolls. Of course the roll, as well as the stationary partition being provided with scraper elements, and due to the fact that linearly movable flexible scraping mechanisms are moving at all times between said roll and partition acting on the under part of the carcass, the carcass is entirely cleaned and polished, and the remaining traces of hair entirely removed. The small high speed rollers 97, assist in maintaining the carcass properly positioned during the operations, and whenever contacting the carcass, act to aid in the polishing and dehairing operation. After the carcass has passed through the third stage of the machine it is hooked upon the slatted conveyer by means of a gambrel and elevated to a position from which it may be removed for further operation, and during such movement is allowed to drain, the drain water of course being returned to the tank 4 from the drip pan 118, disposed beneath said conveyer.

It is noticeable that in this machine the partitions which separate the tanks in the different stages are of such type that a flow of water takes place from the tank of the first stage through that of the second stage and finally into that of the third stage. It has been found desirable and economical to remove the scraped hair from the wash water, and for this purpose a rotary pump 124, is disposed at any convenient position with the intake pipe 125, thereof leading into the tank 2, of the second stage, and the water and hair pumped therefrom is introduced into a screen 126, where the water is allowed to drain through and into the tank of the first stage by means of the pipe 127, the hair remaining in the screen.

I am aware that various details of construction may be varied through a wide range without departing from the principles of this invention. I therefore do not purpose limiting the patent granted otherwise than necessitated by the prior art.

I claim as my invention:

1. In a three stage mechanism for dehairing carcasses, one stage to wash and scald the carcasses, another to scrape and dehair the same, a third to scrub and polish the carcasses, coöperative means for automatically conveying the carcasses from one to another and through said respective stages, and means causing a flow of water to take place through the respective stages from one to the other thereof.

2. In a device of the class described a multi-stage scalding, dehairing, cleaning and polishing machine, a rotatable partially submerged cylinder in the first stage through which the carcass is passed, rotary and linearly acting partially submerged scraping and dehairing mechanisms in the second stage, partially submerged dehairing, cleaning and polishing mechanisms acting rotationally and linearly upon the carcass in the third stage, and means conveying the carcass through each of said stages and from one stage to the other.

3. In a device of the class described a multi-stage dehairing and polishing machine for hogs, rotatable means in the first stage through which the hog is conveyed and scalded, mechanism for conveying the hog from the first stage to the second stage, vertically movable linearly movable scraping and dehairing mechanisms in the second stage, conveying means coacting therewith on which the carcass is supported and conveyed through said second stage, mechanism for conveying the carcass from the second stage to the third stage, and rotarily and linearly acting mechanism in the third stage for cleaning and polishing the carcass, and removing the remaining traces of hair therefrom.

4. In a multi-stage machine of the class described a plurality of tanks, one for each stage of the operation, partitions between said respective tanks, means producing a flow to take place progressively from the last stage to the first stage of the machine, mechanism for moving the carcass through the respective three stages against the flow of the fluid in the tanks, and mechanism in each stage acting to dehair, clean and polish the carcass.

5. In a multi-stage dehairing machine of the class described means insuring a flow of water progressively from the last stage to the first stage of the machine, means moving a carcass through the machine progressively from the first stage to the last stage of the machine against the flow of water in the respective stages, and dehairing mechanisms in each stage of the machine acting upon the carcass to rotate, convey and dehair the same.

6. In a multi-stage dehairing machine of the class described inclined rotative means in the first stage partially submerged to convey a carcass therethrough to scald and dehair the same, mechanism for receiving the carcass from said means and conveying the same into the second stage, means receiving the carcass and moving the same longitudinally therethrough, vertically movable scraper mechanisms acting to rotate the longitudinally disposed carcass while in said second stage, means moving the carcass from the second stage to the third stage of the machine, and rotarily and linearly acting mechanism to convey the carcass longitudinally therethrough rotating the same to scrub, polish and remove the remaining traces of hair therefrom.

7. In a machine of the class described, a long tank divided into a plurality of compartments, the compartments so constructed as to permit a spillway of water successively from one to the other from the rear to the forward end of the tank, mechanisms disposed in each of said compartments, each adapted to perform a portion of the operation of dehairing and polishing a carcass passed through the machine, and means transferring the carcasses from one compartment to another from the forward to the rear end of the tank for operation thereon by said mechanisms.

8. In a machine of the class described, a long tank divided into a plurality of compartments, said compartments constructed to permit a flow of water successively from one to the other from the rear to the forward end of the machine, means to produce such flow, mechanisms for moving a carcass through the machine from the forward to rear end thereof contrary to the direction of flow of water therein, and means operating on the carcass during its progress to dehair and polish the same.

9. In a multi-stage machine of the class described, a long tank, a series of compartments constructed therein, said compartments arranged to permit a spillway of water from one to the other successively from the rear to the forward end of the tank, means to cause a flow of the water through said tank, mechanisms for transferring carcasses from the forward to the rear end of the tank through said respective compartments, said mechanisms comprising in part dehairing and polishing means to remove the hair and refuse from the surfaces of the carcasses as they move through the tank contrary to the direction of flow of water therethrough.

10. A dehairing machine comprising a plurality of stages, separate mechanisms in each stage to operate on a hog passed therethrough, and means independent of said mechanisms for positively transferring a hog from one stage to another in successive order.

11. In a dehairing machine of the class described, a plurality of separate stages for operation upon a carcass passed therethrough, mechanisms in each stage to operate upon a carcass therein, independent means for effecting a positive transfer of a carcass from one stage to another in successive order, and means causing a flow of water through said several stages in successive order.

12. A dehairing machine of the class described comprising a plurality of stages, each thereof containing water, mechanism in each stage operating in the water therein to act upon a carcass passed through said stage, and means between each of said stages independent of said mechanisms for effecting a positive transfer of a carcass from one stage to another in successive order through the machine.

13. A dehairing machine comprising a plurality of stages, each stage comprising a tank with water therein, means constraining a flow of water to take place through said respective stages in successive order, dehairing mechanisms in each of said stages, means independent of said mechanisms for effecting transfer of a carcass from one stage to another in successive order through the machine, and mechanism pumping the water from one stage and discharging the same into another stage for recovery of the hair from the water.

In testimony whereof I have hereunto subscribed my name in the presence of two subscribing witnesses.

WILLIAM B. ALLBRIGHT.

Witnesses:
CHARLES W. HILLS, Jr.,
FRANK K. HUDSON.